United States Patent [19]

Kimura

[11] 4,390,879
[45] Jun. 28, 1983

[54] APPARATUS FOR CONVERTING PHYSICAL QUANTITIES

[75] Inventor: Atsushi Kimura, Yokohama, Japan

[73] Assignee: Hokushin Electric Works, Ltd., Tokyo, Japan

[21] Appl. No.: 170,108

[22] Filed: Jul. 18, 1980

[30] Foreign Application Priority Data

Feb. 15, 1980 [JP] Japan ................................. 55-17293

[51] Int. Cl.³ ............................................ G08C 19/10
[52] U.S. Cl. ................................. 340/870.37; 323/303;
340/870.39; 340/870.17; 340/870.43
[58] Field of Search ...................... 340/870.01, 870.37,
340/870.42, 870.43, 870.39, 870.38, 870.29,
870.17; 323/303, 275, 285; 179/1 P

[56] References Cited

U.S. PATENT DOCUMENTS

| | | | |
|---|---|---|---|
| 3,517,556 | 6/1970 | Barker | 340/870.42 |
| 3,742,473 | 6/1973 | Hadden | 340/870.39 |
| 3,906,471 | 9/1975 | Shawhan | 340/870.37 |
| 3,967,064 | 6/1976 | Sigworth | 340/870.43 |
| 3,975,719 | 8/1976 | Frick | 340/870.37 |
| 4,198,621 | 4/1980 | Roper | 340/870.39 |

*Primary Examiner*—James J. Groody
*Attorney, Agent, or Firm*—Blakely, Sokoloff, Taylor & Zafman

[57] ABSTRACT

An apparatus is disclosed for converting a physical quantity into variations in electric current. The apparatus comprises a power source, a control circuit for controlling an output amplitude of the power source, a detecting circuit supplied with the output of the power source, the electrical characteristics of the detecting circuit being varied in accordance with a physical quantity to be measured and ambient conditions, a converting circuit for amplifying the difference between a first electrical output of the detecting circuit and a reference value, and for converting the amplified difference into an output of the apparatus, and a negative feedback circuit for feeding back a portion of the output to the control circuit. A second electrical output of the detecting circuit is also input to the control circuit whereby the output of the control circuit controls the output amplitude of the power source.

7 Claims, 12 Drawing Figures

(A)

(B)

APPARATUS FOR CONVERTING PHYSICAL QUANTITIES

BACKGROUND OF THE INVENTION

This invention relates to apparatus for converting such physical quantities as pressure, displacement, tension, temperature, light quantity, etc., into variations in electric current.

Such converting apparatus are used to detect fluid pressure in various manufacturing processes, for example, and the detected pressure is converted into a variation in current. Then the detected result is transmitted to a remote receiving device. Heretobefore, physical quantity converting apparatus having circuit constructions as shown in FIGS. 1 and 2 have been used.

More particularly, the physical quantity converting apparatus comprises a bridge circuit constituted by resistors 101, 102, 104, 105 and a variable resistor 103 acting as a physical quantity detecting element and a Zener diode 106 for applying a stabilized voltage across the bridge circuit. The juncture between the resistor 101 and the variable resistor 103 and that between the resistors 102 and 105 are connected respectively to the non-inverting and inverting inputs of a differential amplifier 107. Thus, when the resistance value of the variable resistor 103 varies, the potential difference between the two inputs of the differential amplifier 107 is amplified and its output is applied to the base electrode of a transistor 109 for varying the current flowing through a load resistor 114 supplied from a DC source 113 via line terminals 111 and 112, resistors 104 and 110 and the collector emitter path of a transistor 109.

However, as the resistance value of the variable resistor 103 increases the current flowing through the transistor 109 and resistor 110 is fed back to the line terminal 112 so that the polarity of the terminal voltage of the resistor 104 would be reversed with respect to that of the terminal voltage of the variable resistor 103. As a consequence a negative feedback circuit is formed through the differential amplifier so that the bridge circuit would be controlled such that the potential difference between two inputs of the amplifier 107 would be decreased to zero, and the bridge circuit becomes a balanced state. At this time, the current flowing through line terminals 111 and 112 will have a value proportional to the resistance value of the variable resistor 103.

A constant voltage circuit 108 is provided for supplying predetermined source voltages to the differential amplifier 107 and the Zener diode 106.

With the construction shown in FIG. 1, however, only an element that can pass current can be used as the element for detecting a physical quantity and it is impossible to use a variable capacitance element or the like as the detecting element.

FIG. 2 is a connection diagram showing a prior art physical quantity detecting apparatus utilizing a variable capacitance element, for example a differential capacitance type difference voltage detector as the detecting element. In this circuit, an oscillator 21 whose output amplitude is controllable is used as a source which is controlled by a differential amplifier 202 acting as a source control circuit. The output of the oscillator 201 is applied to a pair of variable capacitance elements 203 and 204 which differentially varies the capacitances.

Consequently, currents proportional to the frequency and amplitude of the output of the oscillator 201 and to the capacitances of the variable capacitance elements 203 and 204 flow through these capacitance elements. These currents are rectified by diodes 205 through 208. A positive half-wave current flows through a low pass filter constituted by capacitors 209, 211, 214 and resistors 210, 212 and 215, while a negative half-wave current flows through another low pass filter constituted by a resistor 216 and a capacitor 217. Consequently, a terminal voltage proportional to the capcitance elment 203 appears across the resistor 210, whereas a terminal voltage proportional to the capacitance of the variable capacitance element 204 appears across the resistor 212.

A terminal voltage proportional to the sum of the capacitances of the variable capacitance elements 203 and 204 appears across the resistor 215, and this terminal voltage is compared with a reference voltage 213 in the form of a battery by the differential ampifier 202. Since the output amplitude of the oscillator 201 is controlled by the output of the differential amplifier, the output amplitude of the oscillator 201 would be maintained in such a state in which the terminal voltage of the resistor 215 would be maintained at a constant value thus preventing the terminal voltages of the resistors 210 and 212 from being varied due to the variation in the output amplitude of the oscillator 201.

The terminal voltages of the resistors 210 and 212 are applied to both inputs of the differntial amplifier 107 via input resistors 219 and 220 respectively so as to control the transistor 109 in accordance with the difference in the voltages applied to the both inputs, whereby current proportional to the difference between the capacitances of the variable capacitance elements 203 and 204 flows through resistor 110, a potentiometer resistor 223 and line terminals 111 and 112.

It is desirable to maintain the value of the current flowing through line terminals 111 and 112 in a range of 4 to 20 mA regulated as a standard in the field of industrial measurement. To this end the potentiometer resistor 218 is connected across a Zener diode 106 and a negative terminal of the resistor 216, and a predetermined voltage produced by the potentiometer resistor 218 is applied to the inverting input of a differential amplifier 107 via an input resistor 221 so as to set the current to 4 mA within a standard range. On the other hand a voltage of an opposite polarity and produced by the potentiometer resistor 223 is negatively fed back to the non-inverting input of the differential transformer 107 via an input resistor 222, and the amount of feed back is adjusted with potentiometer resistor 223 to obtain a maximum current of 20 mA.

Although in the circuit shown in FIG. 2, the negative feedback loop through the differential amplifier 202 and the negative feedback loop through the differential amplifier 107 are formed independently. As no feedback loop is formed for the entire circuit, when noise enters into the input side of the differential amplifier 107 to cause some kind of external disturbance, the disturbance would be superposed upon the current flowing through the line terminals 111 and 112 thus causing an error in the result of measurement with the variable capacitance elements 203 and 204.

SUMMARY OF THE INVENTION

Accordingly it is an object of this invention to provide an improved apparatus for converting physical quantities which is provided with a negative feedback loop for the entire apparatus so that it can operate stably and hence can prevent errors caused by external disturbances.

Another object of this invention is to provide an improved apparatus for converting physical quantities capable of using any one of various detecting elements.

Briefly stated, according to this invention there is provided apparatus for converting a physical quantity comprising a power source, a control circuit for controlling an output amplitude of the prior source, a detecting circuit supplied with the output of the power source, the electrical characteristics of the detecting circuit being varied in accordance with a physical quantity to be measured and ambient conditions, a converting circuit for amplifying a difference between a first electrical output of the detecting circuit and a reference value and for converting the amplified difference into an output of the apparatus, and a negative feedback circuit for feeding back a portion of the output to the control circuit. A second electrical output of the detecting circuit is also input to the control circuit. The output of the control circuit controls the output amplitude of the power source.

The detecting circuit comprises a pair of differentially controlled detecting elements in the form of capacitors, phototransistors or photocells, and at least one of the detecting elements is controlled by a mechanical displacement caused by a variation of the physical quantity to be measured.

DESCRIPTION OF THE PREFERRED EMBODIMENT

Figure 3:
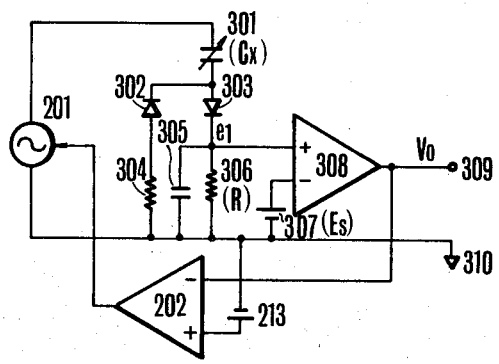
FIG. 3 is a circuit diagram useful to understand the invention.

Turning now to FIG. 3, there is shown a simple circuit useful to understand the invention in which a variable capacitance element 301 is used as a single capacitance type differential voltage detector, and the output voltage of an oscillator 201 is impressed across the capacitance element 301. The current flowing through the capacitance element 301 is detected by diodes 302 and 303 so as to send the negative half-wave to a load resistor 304, while to send the positive half-wave to a low pass filter constituted by a capacitor 305 and a resistor 306. The terminal voltage $e_1$ of the resistor 306 and the voltage $E_s$ of a reference source 307 are respectively impressed upon the non-inverting and inverting terminals of a differential amplifier 308 to amplify the differential voltage between the two inputs for producing an output voltage $V_0$ across an output terminal 309 and an output terminal 310 connected to the opposite terminal of the reference source, the output voltage $V_0$ being proportional to the capacitance $C_x$ of the variable capacitance element 301. The output voltage $V_0$ is also negatively fed back to the differential amplifier 202 thus providing a negative feedback loop for the entire apparatus.

Assume now that the spacing between the movable and stationary electrodes of the variable capacitance element 301 at the initial state is denoted by $d_0$ and that this spacing varies with an increment of $\Delta d$ in accordance with the mechanical displacement of a pressure receiving diaphragm caused by the variation in the physical quantity to the detected, then the capacitance $C_x$ is expressed by the following equation.

$$C_x = C_0 \frac{d_0}{d_0 - \Delta d} \tag{1}$$

where $C_0$ represents the value of the capacitance $C_x$ at the initial state.

The circuit shown in FIG. 3 is controlled such that the voltage $e_1$ becomes equal to $E_s$ as a result of the negative feedback, and the circuit becomes balanced when the voltage differential between the two inputs of the differential amplifier becomes zero so that the following equations hold, $$e_1 = E\omega C_x R \tag{2}$$

$$(E_s - e_1)\mu = V_0 \tag{3}$$

$$E = \alpha V_0 \tag{4}$$

where E represents the amplitude of the output of the oscillator, $\omega$ the angular frequency of the output, R the resistance value of the resistor 306, $\mu$ the amplification factor of the differential amplifier, $\alpha$ the proportionality constant and wherein it is assumed that the amplification factor of the differential amplifier 202 is unity for the sake of simplicity.

From equations (2) and (3) the following equation can be derived out.

$$E_s - E\omega C \times R = \frac{V_0}{\mu}$$

where $\mu$ is very large the following equation holds $$E_s = e_1 \tag{5}$$

From equations (2), (4) and (5) we can obtain the following equation $$E_s = \alpha V_0 \omega C_x R \tag{6}$$

and the following equation can be derived out from equations (1) and (6)

$$V_0 = \frac{1}{\alpha\omega C_x R} E_s = \frac{E_s}{\alpha\omega C_0 R}\left(\frac{d_0 - \Delta d}{d_0}\right) \tag{7}$$

Thus, the output voltage $V_0$ becomes proportional to $\Delta d$.

However, since the output voltage $V_0$ varies with $\omega$ and $C_0$, the output voltage varies according to the variation in the ambient condition such as temperature which results in an error in the result of measurement.

Figure 4:
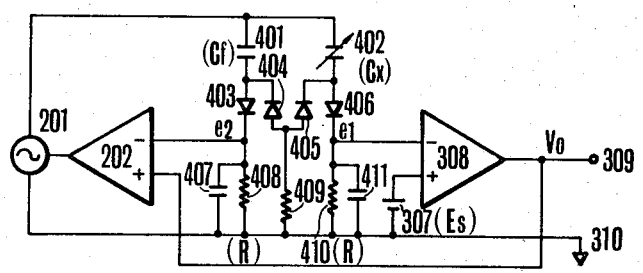
FIG. 4 is a circuit diagram showing the principle of this invention.

FIG. 4 shows a circuit construction capable of obviating difficulties described above, wherein there are provided a pair of detecting elements which varies their electric characteristic according to physical quantities. The detecting elements comprise a fixed capacitance element 401 whose capacitance varies according to the physical quantity of the ambient condition, i.e., an ambient temperature, and a variable capacitance element 402 whose capacitance varies depending upon the ambient physical quantity and upon a mechanical displacement caused by a physical quantity to be detected. The output of an oscillator 201 is applied to these capacitance elements and the current flowing therethrough is detected by diodes 403 through 406. The positive half-wave produced by the diode 403 is applied to a low pass filter constituted by a capacitor 407 and a resistor 408, while the negative half-wave produced by diodes 404 and 405 is supplied to a load resistor 409. The positive half-wave produced by diode 406 is supplied to a low pass filter made up of a resistor 410 and a capacitor 411 to obtain the terminal voltage $e_1$ of the resistor 410 as an electrical output of one detecting element, while the terminal voltage $e_2$ of the resistor 408 is obtained as an electrical output of the other detecting element.

The voltage $e_2$ is applied to the inverting input of a differential amplifier 202 to control the amplitude of the output of the oscillator 201 on the assumption that the voltage $e_2$ is equal to $V_0$. The output voltage $V_0$ is applied to the non-inverting input of the differential amplifier 202 thereby establishing a negative feedback circuit for the entire circuit. With this construction, the circuit becomes balanced when the voltages applied to both inputs of the differential amplifier become equal in the same manner as in FIG. 3.

For this reason denoting the capacitance of the fixed capacitance element 401 by $C_f$, that of the variable capacitance element 402 by $C_x$ (in the same manner as in FIG. 3), the resistance values of the resistors 408 and 410 by R, the amplification factor of the differential amplifier 308 by $\mu_1$, that of the differential amplifier 202 by $\mu_2$, the proportionality constant by $\beta$, we obtain the following equations.

$$e_1 = E\omega C_x R \quad (8)$$

$$e_2 = E\omega C_f R \quad (9)$$

$$(E_s - e_1)\mu_1 = V_0 \quad (10)$$

$$(V_0 - e_2)\mu_2 = \beta E \quad (11)$$

By modifying equations (10) and (11) we obtain $$\left. \begin{array}{l} e_1 = E_s - \dfrac{V_0}{\mu_1} \\[4pt] e_2 = V_o - \dfrac{\beta E}{\mu_2} \end{array} \right\} \quad 12$$

Also from equations (8) and (12) we obtain $$E\omega C_x R = E_s - \frac{V_0}{\mu_1}$$

Substitution of this relationship into equation (1) holds the following equation $$E\omega C_0 R \frac{d_0}{d_0 - \Delta d} = E_s - \frac{V_0}{\mu_1} \quad (13)$$

Furthermore, we can derive out the following equation from equations (9) and (12)

$$E\omega C_f R = V_o - \frac{\beta E}{\mu_2} \quad (14)$$

Consequently, we can obtain the following equation from equations (13) and (14)

$$\left( V_0 - \frac{\beta E}{\mu_2} \right) \frac{d_0}{d_0 - \Delta d} = E_s - \frac{V_0}{\mu_1} \quad (15)$$

Where $\mu_1$, and $\mu_2$ are extremely large $$V_0 = \frac{C_0}{C_x} E_s = E_s \left( \frac{d_0 - \Delta d}{d_0} \right) \quad (16)$$

This means that the output voltage $V_0$ is proportional to only $\Delta d$ and not affected by $\omega$ and $C_0$.

Figure 1:
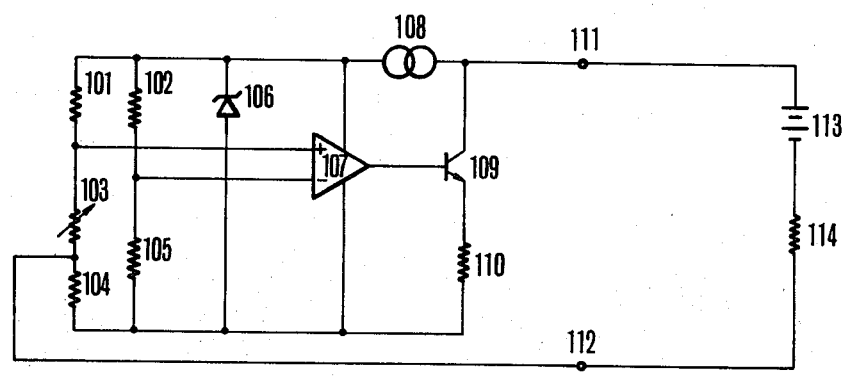
FIGS. 1 and 2 are connection diagrams showing two examples of the prior art apparatus for converting physical quantities.
Figure 2:
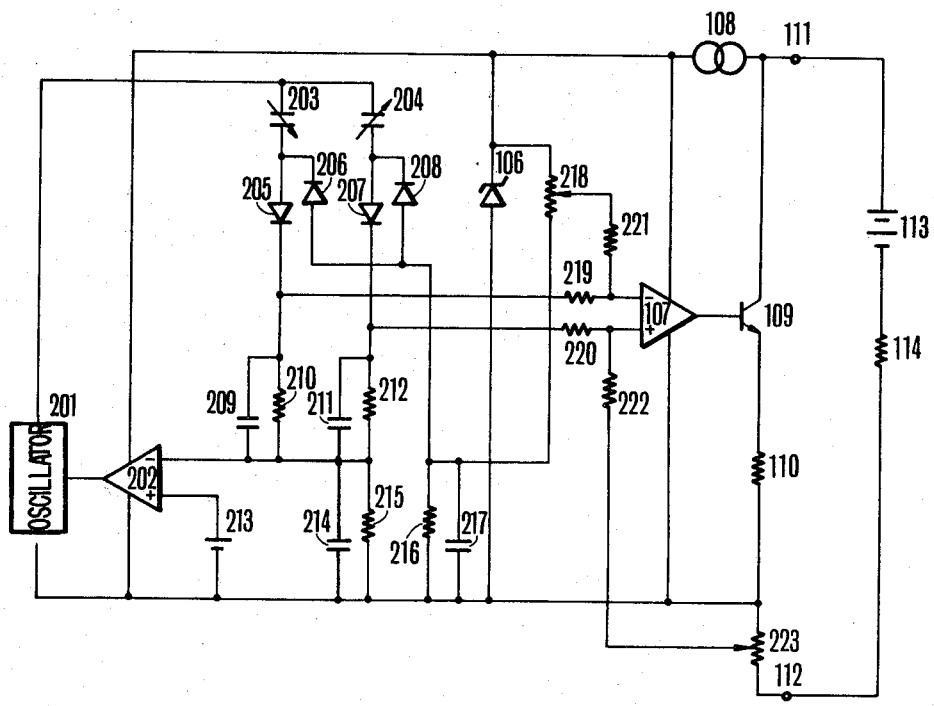
Figure 5:
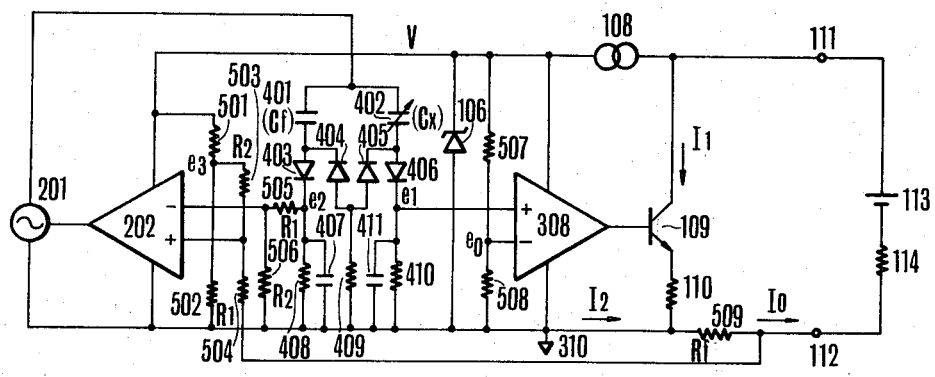
FIGS. 5 through 8 are connection diagrams showing various embodiments of this invention utilizing variable impedance elements.

FIG. 5 and the following drawings are connection diagrams showing various embodiments of this invention based on the principle described above. In the circuit shown in FIG. 5, voltage $e_3$ obtained by dividing the source voltage V with resistors 501 and 502 is applied to the non-inverting input of the differential amplifier 202 through a resistor 503 so as to establish a reference voltage, whereas the terminal voltage of a feedback resistor 509 connected between a point 310 of a reference potential of a two wire type conversion circuit having a similar construction as that shown in FIG. 2, and the line terminal 112 is applied to the non-inverting input of the differential amplifier 202 via a resistor 504 thus forming a negative feedback loop for the entire apparatus.

The terminal voltage $e_2$ of the resistor 408 is applied to the inverting input of the differential amplifier 202 through a potentiometer including resistors 505 and 506 so that the voltage $e_2$ is controlled to be constant.

The reference voltage $e_0$ for the differential amplifier 308 is set by dividing the source voltage with resistors 507 and 508 and by feeding back this reference voltage through a resistor 509 the difference between both input voltages $e_1$ and $e_0$ of the differential amplifier 308 becomes substantially zero and the circuit becomes a balanced state.

Denoting now the resistance value of resistors 504 and 505 by $R_1$, that of the resistors 503 and 506 by $R_2$, the resistance value of the resistor 509 by $R_f$, the collector current of a transistor 109 by $I_1$, and the current flowing from the differential amplifier 308 to resistor 509 via the point 310 of the reference potential by $I_2$, and the output current flowing to the line terminal 112 by $I_0$, the following equations hold.

$$e_1 = E\omega C_x R \quad (17)$$

$$e_2 = E\omega C_f R \quad (18)$$

$$(e_1 - e_0)\mu_t = I_1 \quad (19)$$

$$I_1 + I_2 = I_0 \tag{20}$$

$$\left( e_3 \frac{R_1}{R_1 + R_2} - \frac{R_2}{R_1 + R_2} R_f I_0 - \frac{R_2}{R_1 + R_2} e_2 \right) \mu_2 = E \tag{21}$$

where $\mu_t$ represents a resultant amplification factor of the differential amplifier 308 and the transistor 109.

Accordingly, it is possible to derive out the following equations from equations (19) and (20)

$$I_0 = (e_1 - e_0)\mu_t + I_2 \tag{22}$$

$$e_1 = e_0 + \frac{I_0 - I_2}{\mu_t}$$

Furthermore from the equations (17) and (22) we can derive out the following equations.

$$E\omega C_x R = e_0 + \frac{I_0 - I_2}{\mu_t} \tag{23}$$

$$E = \frac{e_0}{\omega C_x R} + \frac{I_0 - I_2}{\omega C_x R \mu_t}$$

and from equations (18), (21) and (23) we can derive out the following equations $$\left( \frac{R_1}{R_1 + R_2} e_3 - \frac{R_2}{R_1 + R_2} R_f I_0 \right) \mu_2 - \tag{24}$$

$$\frac{R_2}{R_1 + R_2} \left( \frac{e_0}{\omega C_x R} + \frac{I_0 - I_2}{\omega C_x R \mu_t} \right) \omega C_f R \mu_2 =$$

$$\frac{e_0}{\omega C_x R} + \frac{I_0 - I_2}{\omega C_x R \mu_t}$$

$$\left( \frac{R_1}{R_1 + R_2} e_3 - \frac{R_2}{R_1 + R_2} R_f I_0 \right) - \tag{25}$$

$$\frac{R_2}{R_1 + R_2} \left( \frac{e_0}{\omega C_x R} + \frac{I_0 - I_2}{\omega C_x R \mu_t} \right) \omega C_f R =$$

$$\frac{e_0}{\omega C_x R \mu_2} + \frac{I_0 - I_2}{\omega C_x R \mu_t}$$

Where $\mu_t$ and $\mu_2$ are extremely large $$\frac{R_1}{R_1 + R_2} e_3 - \frac{R_2}{R_1 + R_2} R_f I_0 - \frac{R_2}{R_1 + R_2} \cdot \frac{e_0}{\omega C_x R} \omega C_f R = 0 \tag{26}$$

$$\therefore R_2 R_f I_0 = R_1 e_3 - R_2 e_0 \frac{C_f}{C_x}$$

By introducing the relationship expressed by equation (1) into this equation we obtain the following equation $$I_0 = \frac{1}{R_f} \left( \frac{R_1}{R_2} e_3 - e_0 \frac{C_f}{C_x} \right) \tag{27}$$

-continued $$= \frac{1}{R_f} \left( \left( \frac{R_1}{R_2} e_3 - e_2 \right) + \frac{\Delta d}{d_0} e_0 \right)$$

This equation shows that $I_0$ is proportional to $\Delta d$.

Figure 6:
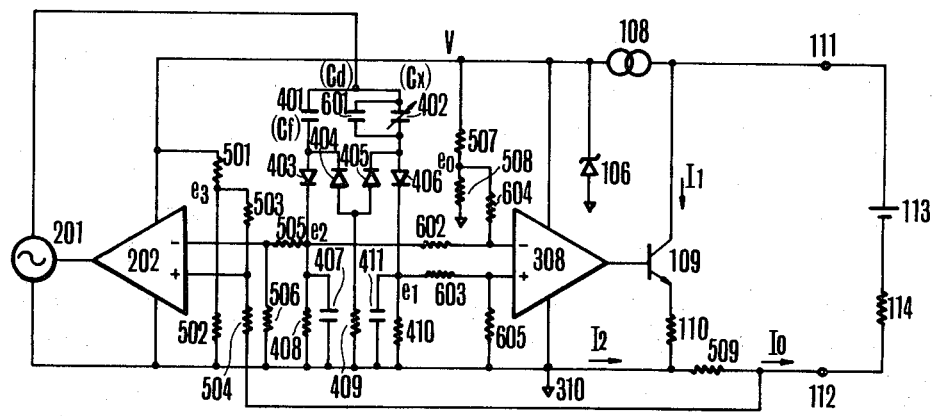

In the modification shown in FIG. 6, a linearity correction capacitance element 601 is connected in parallel with the variable capacitance element 402 for the purpose of correcting the tendency of changing the characteristic of the variable capacitance element 402 to become nonlinear, and input resistors 602 through 605 and a differential amplifier 308 are connected to form a substraction circuit. The amplitude of the output of the oscillator 201 is controlled by a negative feedback from a resistor 509 such that an equation $e_1 - e_2 = e_0$ would hold so as to prevent measurement errors caused by the variation of $\omega$ and $C_6$.

Again the output current $I_0$ is shown by equation (27).

Figure 7:
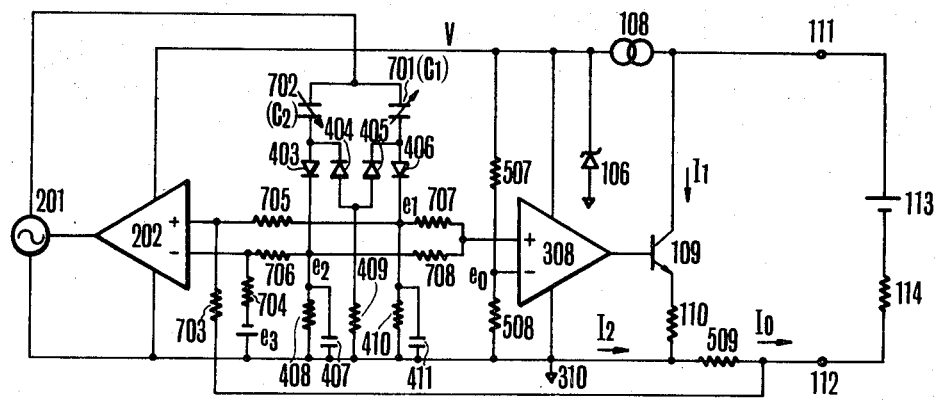

The embodiment shown in FIG. 7 utilizes a pair of variable capacitance elements 701 and 702 in the form of differential capacitance type differential pressure detectors which vary their capacitances according to a mechanical displacement of pressure receiving diaphragms subjected to physical quantities to be detected. A negative feedback is applied to the non-inverting input of the differential amplifier 202 through a resistor 703, whereas the reference voltage $e_3$ is applied to the inverting input of the differential amplifier 202 through a resistor 704. Input resistors 705 and 706 and the differential amplifier 202 are connected to constitute a subtraction circuit, whereas input resistors 707 and 709 and a differential amplifier 308 are connected to constitute an addition circuit.

To this end, the amplitude of the output of the oscillator 201 is controlled such that the sum of voltages $e_1$ and $e_2$ would be equal to the reference voltage $e_0$ and the amplitude of the oscillator 201 is auxiliarily controlled by the difference between voltages $e_1$ and $e_2$ so as to prevent the output current $I_0$ from being affected by the variations of $\omega$ and $C_0$.

More particularly, when the capacitances of the variable capacitance elements 701 and 702 are denoted by $C_1$ and $C_2$ respectively, the following equations hold in the same manner as in FIG. 5.

However, for convenience, it is now assumed that the resistance values of respective resistors 703 and 706 are equal and that the resistance values of resistors 707 and 708 are also equal.

$$e_1 = E\omega C_1 R \tag{28}$$

$$e_1 = E\omega C_2 R \tag{29}$$

$$\left( \frac{e_1 + e_2}{2} - e_0 \right) \mu_t = I_1 \tag{30}$$

$$I_0 = I_1 + I_2 \tag{31}$$

$$\{(e_1 - R_f I_0) - (e_2 - e_3)\}\mu_2 = E \tag{32}$$

$$\{(e_1 - e_2) - (R_f I_0 - e_3)\}\mu_2 = E \tag{33}$$

From equations (30) and (31) we obtain $$I_0 = \left( \frac{e_1 + e_2}{2} - e_0 \right) \mu_t + I_2 \tag{34}$$

-continued $$e_1 + e_2 = 2e_0 + 2\frac{I_0 - I_2}{\mu_t}$$

From equations (28), (29) and (34), we obtain $$E\omega R(C_1 + C_2) = 2e_0 + 2\frac{I_0 - I_2}{\mu_t} \quad (35)$$

$$E = \frac{2e_0}{\omega R(C_1 + C_2)} + 2\frac{I_0 - I_2}{\omega R(C_1 + C_2)\mu_t}$$

Furthermore, from equations (28), (29), (33) and (35) the following equations can be derived out.

$$\left\{\left(\frac{2e_0}{\omega R(C_1 + C_2)} + 2\frac{I_0 - I_2}{\omega R(C_1 + C_2)\mu_t} - \omega R(C_1 - C_2) - (R_f I_0 - e_3)\right)\mu_2 = \frac{2e_0}{\omega R(C_1 + C_2)} + 2\frac{I_0 - I_2}{\omega R(C_1 + C_2)\mu_t}\right. \quad (36)$$

$$\left(\frac{2e_0}{C_1 + C_2} + 2\frac{I_0 - I_2}{(C_1 + C_2)\mu_t}\right) \cdot (C_1 - C_2) - R_f(I_0 - e_3) = \frac{2e_0}{\omega R(C_1 + C_2)\mu_2} + 2\frac{I_0 - I_2}{\omega R(C_1 + C_2)\mu_t} \quad (37)$$

where $\mu_t$ and $\mu_2$ are extremely large, the following equation holds $$\frac{2e_0}{C_1 + C_2} \cdot (C_1 - C_2) - (R_f I_0 - e_3) = 0 \quad (38)$$

$$R_f I_0 = e_3 + \frac{C_1 - C_2}{C_1 + C_2} \cdot 2e_0$$

By introducing the relationship expressed by equation (1) into equation (38), the following equation can be derived out $$I_0 = \frac{1}{R_f}\left(e_3 + 2\frac{\Delta d}{d_0} e_0\right) \quad (39)$$

This means that $I_0$ is proportional to $\Delta d$.

While in the foregoing embodiment variable capacitance elements were used as the detecting elements, the same object can also be accomplished by using a pair of variable inductance elements whose inductances vary differentially in accordance with a mechanical displacement caused by a physical quantity to be detected or differential transformers, or differential inductance type displacement detectors.

Figure 8:
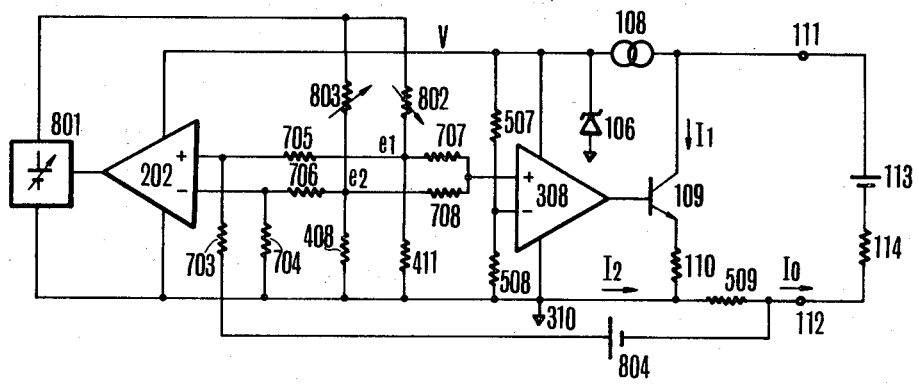

FIG. 8 shows a connection diagram showing still further modification in which a pair of variable resistance elements whose resistance values are varied differentially according to a mechanical displacement caused by a variation in the physical quantity to be detected, are used as the detecting elements. More particularly, the output voltage of a variable DC source 801 is applied to such variable resistors as strain gauges 802 and 803 to obtain terminal voltages $e_1$ and $e_2$ corresponding to the differential variations in the resistance values of these resistance elements. Remaining elements are identical to those shown in FIG. 7, except that a bias source 804 is provided for the feedback circuit extending between resistor 509 and resistor 703 for the purpose of applying a predetermined voltage to the non-inverting input of the differential amplifier 202.

Where either one of the variable resistance elements 802 and 803 is used to detect a physical quantity, the other resistance element may be substituted by a fixed resistance element having identical characteristic to form a circuit constructions as shown in FIG. 5.

Figure 9:
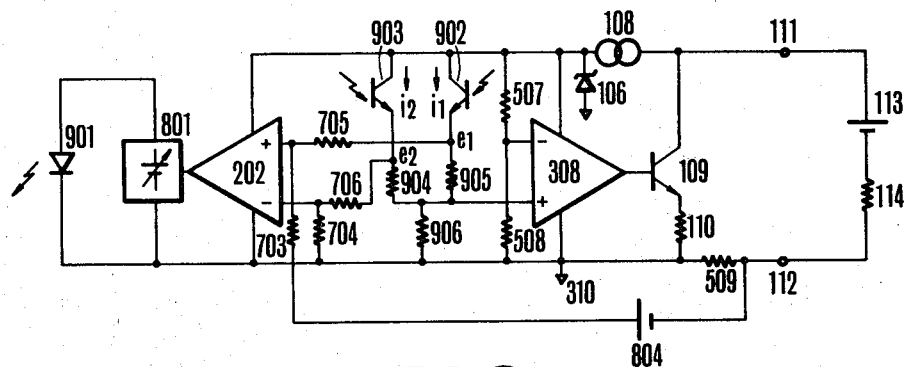
FIG. 9 is a connection diagram showing a modified embodiment utilizing light receiving elements.
Figure 10:
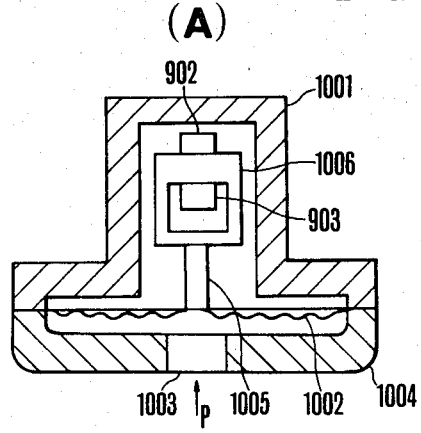
FIG. 10A is a front view, largely in section, of a light quantity control mechanism.
FIG. 10B is a cross-sectional view of the light quantity control mechanism.
Figure 10:
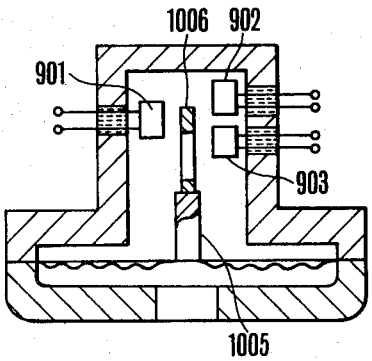
Figure 11:
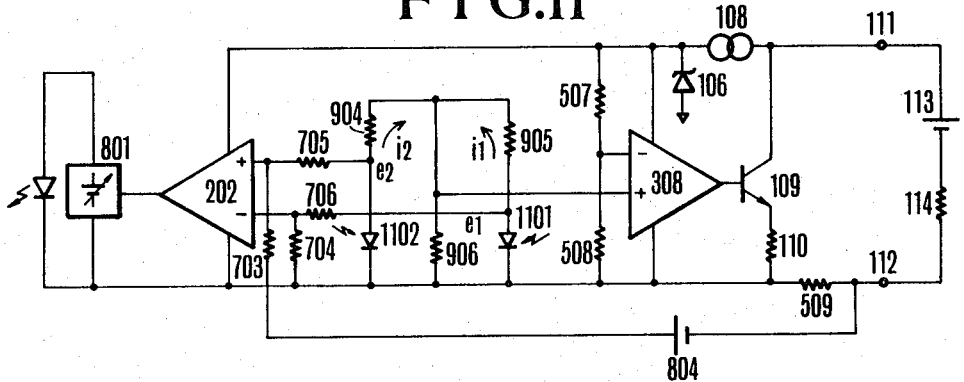
FIG. 11 is a connection diagram showing a further modified embodiment utilizing light receiving elements.

FIGS. 9 through 11 show still another embodiments of this invention in which light receiving units are used as the detecting elements.

In FIG. 9 the output voltage of a DC source 801 is applied across a luminous element 901, for example a luminous diode, and the light emitted thereby is received by a pair of light receiving elements 902 and 903, for example phototransistors. The light quantities impinging upon the light receiving elements 902 and 903 are varied in accordance with a physical quantity to be detected by using a light quantity control apparatus to be described later.

Thus, the currents $i_1$ and $i_2$ flowing through light receiving elements 902 and 903 vary differentially so that resulting terminal voltages $e_1$ and $e_2$ of resistors 904 and 905 are applied to both input of the differential amplifier 202 whereby the output of the differential amplifier 202 varies according to the difference between the voltages $e_1$ and $e_2$ so as to control the quantity of light emitted by the luminous element 901. Consequently, the variations in the output currents $i_1$ and $i_2$ of the light receiving elements 902 and 903 are suppressed with the result that the light quantities incident to the light receiving elements 902 and 903 vary differentially and currents $i_1$ and $i_2$ would be maintained at constant values.

Since both currents $i_1$ and $i_2$ flow through a resistor 906 its terminal voltage corresponds to the sum of both currents $i_1$ and $i_2$. This terminal voltage is convert into an output current $I_0$ by a convertig circuit consisting of a differential amplifier 308 and a transistor 109, the output current $I_0$ being proportional to the difference between the light quantities incident to the light receiving elements. Remaining elements are identical to those shown in FIG. 8.

The light quantity control mechanism shown in FIGS. 10A and 10B comprises a casing 1001 made of metal or the like, a pressure receiving member 1002 in the form of a diaphragm with its periphery secured to the opening of the casing 1001 and a cover 1004 covering the diaphragm and formed with an opening 1004.

At the center of the diaphragm 1002 is secured one end of a rod 1005 carrying a light intercepting plate 1006 on the other end and a pair of light receiving elements 902 and 903 are disposed to oppose the light intercepting plate 1006.

The position and configuration of the light intercepting plate 1006 are selected such that the light from a luminous element 901 equally impinges upon the light receiving elements 902 and 903 when no pressure P is applied to the diaphragm 1002.

Consequently, as the pressure P is applied to the pressure receiving member, i.e., diaphragm 1002 to displace the same, the light intercepting plate 1006 is moved upwardly to decrease the light quantity incident to the light receiving element 902 and to increase the light quantity incident to the light receiving element 903, thus differentially varying the output currents $i_1$ and $i_2$ of the light receiving elements 902 and 903.

The light quantity control mechanism can be modified as desired. For example independent luminous elements may be provided for respective light receiving elements 902 and 903 and a light intercepting plate is operated to differentially open and close respective light paths.

In the embodiment shown in FIG. 11, a pair of photo cells 1101 and 1102 are used as the light receiving elements to produce output currents $i_1$ and $i_2$ proportional to the light quantities incident upon respective photocells. The terminal voltage of a resistor 906 corresponds to the sum of the output currents $i_1$ and $i_2$ and utilized to form a current circulating through output terminals 111 and 112. The voltages $e_1$ and $e_2$ of the photocells 1101 and 1102 are applied to the differential amplifier 202 in the same manner as in FIG. 9.

The light quantity incident upon either one of the light receiving elements 902 and 903 or 1101 and 1102 may be varied in accordance with the physical quantity to be detected.

The output current of the differential amplifier 308 may be circulated through a single line circuit, and the DC source 801 may be substituted by an AC source. Furthermore the outputs of the detecting elements may be rectified and the inputs of the differential amplifiers 202 and 308 may be exchanged. In this manner, various changes and modifications may be made within the scope of this invention as defined in the appended claims.

As above described, according to this invention, since a negative feedback loop is provided for the entire physical quantity converting circuit it is possible to not only prevent measuring errors caused by external disturbances but also to use any type of detecting elements.

What is claimed is:

1. Apparatus for converting a physical quantity into an electrical signal representative of the quantity without error from changes in ambient conditions comprising:
   a power source for supplying electrical power of said apparatus;
   a detecting circuit means supplied with the output of said power source for detecting variations in a physical quantity to be measured, the electrical characteristics of said detecting circuit means being varied in accordance with changes in said physical quantity to be measured, and in accordance with changes in ambient conditions;
   a reference electrical value;
   a converting circuit means for amplifying a difference between a first electrical output of said detecting circuit means and said reference value, and for converting the amplified difference into an output of said apparatus;
   a negative feedback circuit means for feeding back a feedback signal which is a portion of said output of said apparatus to a control circuit means; and
   said control circuit means for comparing a second electrical output of said detecting circuit means with said feedback signal, and for controlling the electrical power supplied by said power source in accordance with said comparison.

2. The apparatus according to claim 1 wherein said output of said apparatus is sent to a remote measuring means and wherein said converting circuit means comprises a first differential amplifier for amplifying the difference between said first electrical output of said detecting circuit means, and said reference value, said control circuit means comprises a second differential amplifier for comparing said second electrical output of said detecting circuit means with said feedback signal and said negative feedback circuit means is connected between an output terminal of said first differential amplifier and one input terminal of said second differential amplifier to whose other input terminal is connected said second electrical output of said detecting circuit means.

3. The apparatus according to claim 1 wherein said detecting circuit means comprises a fixed capacitance element which changes it capacitance in accordance with an ambient condition above and a variable capacitance element which varies its capacitance in accordance with a mechanical displacement caused by the physical quantity to be measured.

4. The apparatus according to claim 2 wherein said detecting circuit means comprises a pair of detecting elements in the form of variable capacitance elements which differentially vary capacitances thereof in accordance with a mechanical displacement caused by the physical quantity to be detected, wherein the sum of the outputs of said detecting circuit means is applied to one input terminal of said first differential amplifier and a reference voltage is applied to the other input terminal of said first differential amplifier, and wherein a difference between outputs of said detecting circuit means is applied to one input terminal of said second differential amplifier and said feedback signal is applied to the other input terminal of said second differential amplifier.

5. The apparatus according to claim 1 wherein said detecting circuit means comprises a source of light, a pair of light receiving elements disposed to receive light emitted from said source of light, and means responsive to said physical quantity to be measured for differentially varying light quantities impinging upon said light receiving elements.

6. The apparatus according to claim 5 wherein said light receiving elements comprise phototransistors.

7. The apparatus according to claim 5 wherein said light receiving elements comprise photocells.

* * * * *